United States Patent [19]

Stockli et al.

[11] Patent Number: 5,212,884
[45] Date of Patent: May 25, 1993

[54] DEVICE FOR THE SERIES PRODUCTION OF MOEBIUS-TYPE RIBBONS

[75] Inventors: Xaver Stockli, Richterswil; Jurg Messerli, Samstagern, both of Switzerland

[73] Assignee: SM Engineering AG, Wollerau, Switzerland

[21] Appl. No.: 760,410

[22] Filed: Sep. 16, 1991

[30] Foreign Application Priority Data

Sep. 28, 1990 [CH] Switzerland ............ 03133/90

[51] Int. Cl.⁵ ................................ B23P 19/00
[52] U.S. Cl. ................................ 29/806; 29/819; 29/241; 29/433
[58] Field of Search ................ 29/701, 702, 779, 783, 29/806, 819, 241, 244, 252, 281.1, 283, 433; 242/197; 400/195, 196; 901/2, 8, 50

[56] References Cited

U.S. PATENT DOCUMENTS 3,538,584 11/1970 Carpenter et al. ............ 29/819 X
4,130,367 12/1978 Guerrini et al. .

FOREIGN PATENT DOCUMENTS 0019649 6/1979 European Pat. Off. .
0231645 8/1987 European Pat. Off. .
0266056 5/1988 European Pat. Off. .
639593 11/1983 Switzerland .

OTHER PUBLICATIONS

IBM Technical Disclosure Bulletin, vol. 32, No. 7, Dec. 1989, pp. 377-380.

Primary Examiner—Timothy V. Eley
Attorney, Agent, or Firm—Schweitzer, Cornman & Gross

[57] ABSTRACT

An apparatus for the series production of Moebius ribbons comprises a threading robot having its four degrees of freedom (X,Y,Z,R). A second robot, movable in one direction, with two degrees of freedom (Z',R') is mounted on the first robot. The two robots cooperate to transfer between them a ribbon of delicate material, the ribbon being extracted from the ribbon cartridge and imparted with the 180° twist required for the manufacturing of the Moebius ribbon.

14 Claims, 6 Drawing Sheets

DEVICE FOR THE SERIES PRODUCTION OF MOEBIUS-TYPE RIBBONS

The present invention relates to a device for the series production of Moebius-type ribbons in the course of the manufacturing of ribbon receptacles equipped with endless ribbons, especially of ribbon cartridges, as well as a method for operating the device and the use thereof.

BACKGROUND OF THE INVENTION

Endless bands for technical applications of various kinds are in daily use, for instance in power transfer, e.g., transmissions, for transport purposes, as tools in the form of grinding belts, as measurement auxiliaries, as well as in data storage devices. Also known is their use for ink storage in the form of ink ribbons for typewriters and printers.

Endless bands are often utilized in such a way that only one of the two available surfaces is used for the desired purpose, e.g., for transport, or storage, such that only one surface is exposed to wear. According to A.F. Moebius (1790–1868), an endless strip may be produced by connecting the narrow edges of a given plane strip in such a way that the initially diagonally opposite corners are made to coincide. The resulting Moebius strip represents a surface having one side only; one can reach any point of that surface, or use it for any technical purpose, without going beyond the strip's edge. Moebius strips, in the form of ink ribbons utilizing both sides of the starting ribbon are used in modern typewriters and heavy-duty printers (impact printers). These ribbons and ribbon cartridges must be produced in large quantities at the lowest costs possible. An indispensable precondition for this is a high degree of automatization.

A short amortization period for the production facilities and high versatility have become possible only through the application of robots. Their accurate positioning behavior, the possibility of simple programming and of self-control (monitoring) has also proved advantageous in the manufacturing of ink ribbons and ink ribbon cartridges. In case of changes in the geometry of the ribbon cartridge and the material quality of the ribbons, the flexibility of automated assembly installations using such robots allows the required parameters to be easily modified.

While the assembly of ink ribbons has been at least partly effected manually, here too, transfer lines have recently been applied, both of the linear type and as rotary-table installations, in which in particular the threading into a ribbon cartridge of the ribbon is performed robotically. With Moebius ribbons, however, manually performed intermediate steps are necessary, causing the output rate of the installation to be considerably reduced and the defect rate, being dependent on the reliability of the operator, to be relatively high.

It is thus an object of the invention to produce, by improvement of per se known assembly robots, a Moebius ribbon and to automate the process, while giving full consideration to the fact that the ribbons being used are usually mechanically sensitive, and that along their full, endless and two-sided extent, these ribbons must guarantee a high and constant quality printout.

A further object of the invention is the development of an assembly apparatus and methodology having lowered manufacturing and operational costs, the warranty of high versatility, as well as the possibility of easily adapting the working parameters such as speed and forces to differing ribbon qualities and ribbon cartridge geometries.

BRIEF DESCRIPTION OF THE INVENTION

The above objects are achieved in an apparatus in which there is mounted on the above-mentioned first robot a second robot having at least two degrees of freedom, which second robot, in a predetermined ribbon section, twists the ribbon in its longitudinal direction by 180°. This second robot may be, in the simplest case, a so-called manipulator directly mounted on the first robot.

The present invention provides the decisive advantage of always allowing for manufacturing tolerances of the ribbon cartridge, of tolerances in assembly, of deviations in the movement of the first robot and the like, as the second robot is given origin coordinates for operation relative to the gripper of the first robot independently of the position of the latter. Such methodology facilitates programming of the entire system. The fact that the second robot is moved together with the arm of the first robot, i.e., that, in its standby position, its gripper is directly adjacent to the gripper of the first robot, furthermore avoids intermediate periods such as would be necessary by the utilization of a second, independent robot, thus leading to the shortest possible cycle time.

In a preferred embodiment, the direction of movement of the second robot relative to the first one is perpendicular to the plane of the cartridge. This minimizes the duration for the movement from the standby position to the working position and reduces space requirements to a minimum, so that the ribbon needs to be led upwardly out of the ribbon cartridge only for a short distance.

In another particularly advantageous embodiment, a guide slide is preferably designed as a roller guide. Such construction reduces lost motion in this linear drive to an absolute minimum that, with permissible prestressing of the roller bodies, can even be reduced to zero. With this method, the effects of tolerance variations are avoided. This solution leads to a particularly vibration and friction-free operational sequence.

A pneumatically actuated toothed belt for performing the rotary movement of the gripper of the manipulator provides simple pneumatic actuation and control, thus ensuring the exact positioning of the gripper slot during transfer of the ribbon, rendering the space requirements of the rotary gripper particularly small.

A toggle-lever gripper may be chosen as the tool for the first robot, and a miniature parallel gripper for the second robot. The toggle-lever gripper with filigree-type gripping pincers which, when introduced for the threading process, require only little space, has the further property that these pincers can be spread open up to an angle of 90°. Consequently, the ribbon, having been gripped by the parallel pincers of the second robot, can be safely rotated by the required 180°, while the toggle-lever gripper is waiting in the immediate vicinity and is able to again take over the ribbon after the twist and at a short distance to the parallel gripper, thereby avoiding damage to the ribbon and limiting gripper marks to a very short section of the ribbon.

Ribbon securing elements may be provided which, during the twisting process, reliably hold down the ribbon in the ribbon cartridge, preventing the ribbon from slipping out of the ribbon exit slot after the twisting, and secure the position of the twist until that function is taken over by a guide projection in the ribbon cartridge lid.

Flexibility of the entire automatic assembly device of the present invention is enhanced by the improvement of not attaching the ribbon securing elements to the workpiece carrier, but to mount them on a special carrier plate which, in its turn, is attached to the transfer system. This carrier plate is exchangeable for each cartridge, thus facilitating rapid changeover to other cartridge types.

The sequence of movements selected for the mutually movably mounted robots is such that they are mutually controlled and timed, which ensures an automatic control of that sequence of movements and avoids the danger of manipulator collisions. Thus, the control provides for the conclusion of one operational step to initiate the subsequent step.

With a view to the flexibility of the entire assembly installation, additional actuating elements may be selected in such a way as to exclusively employ pneumatic control and actuation. Not only is this method particularly economical, but it also facilitate the specific adaptation of the system to the materials employed and their changing geometries, as well as to the working speeds, accelerations, the prevailing forces, and other related parameters.

Particularly advantageous is an aspect of the present invention whereby the Moebius twist is not carried out inside the ribbon cartridge, but in a plane parallel to the cartridge plane. Because of the miniaturized design of the robot tools, this plane is located only slightly above the cartridge plane, so that working-step durations are short and deformation of the ribbon, which could possibly lead to damage, is reduced to a minimum. In addition, this methodology facilitates the assembly of ribbon cartridges of any geometry, particularly in cartridges where space is at a premium.

It is furthermore expedient to carry out the threading operation not with the active ribbon, for example the ink ribbon, but with the help of a per se known leader tape or ribbon which, for additional safety, may be retained in two ribbon guides, and can thus be moved without risk to an adjacent working station of the transfer installation, where the active ribbon is pulled into the ribbon cartridge by the leader ribbon, with the Moebius twist being formed at the predetermined location.

A device of the character described for automatic production of ink ribbon cartridges for impact printers in accordance with the present invention has proved particularly advantageous with low manufacturing costs and a fully automatic quality control.

DETAILED DESCRIPTION OF THE INVENTION

Figure 1:
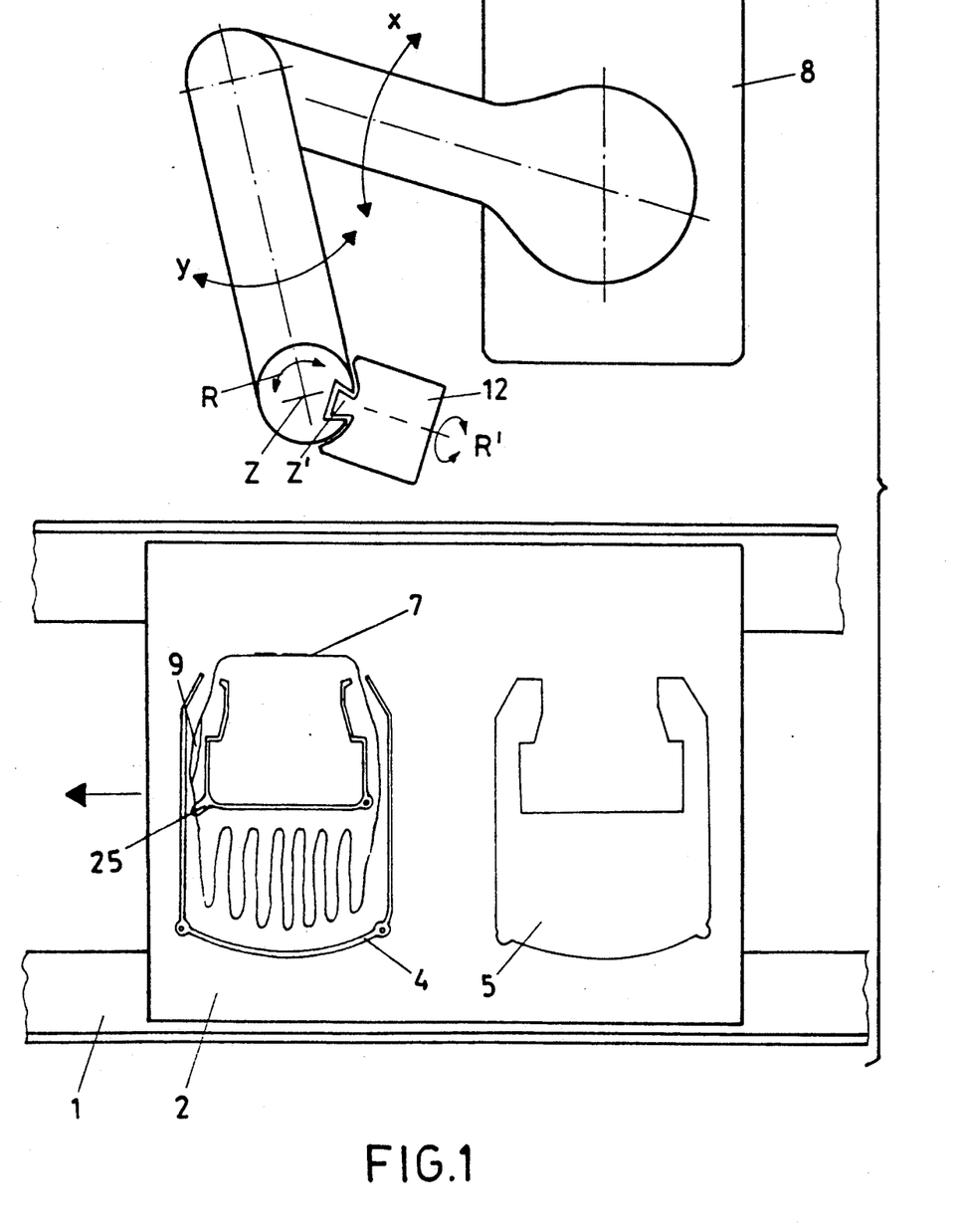
FIG. 1 is a schematic representation of the invention with an ink ribbon cartridge on a transfer belt, the second robot being mounted on the first assembly robot.

FIG. 1 is a schematic top view of a workstation according to the invention. The transfer system 1 moves the workpiece carrier 2 in a timed sequence from one workstation to another. The ink ribbon cartridge shown, into which the ribbon, or the leader ribbon 7 preceding the latter, is to be threaded by the first robot 8, is clamped to the workpiece carrier. The lower part 4 of the ribbon cartridge is to the left, while at the right the ribbon cartridge lid 5 is carried along. The robot 8 stands outside of the transfer system. It has at least four degrees of freedom; shown are two rotary movements X, Y, a vertical translational movement Z, as well as the rotation R about the gripper axis, all known from commercially available robots. Due to these degrees of freedom, the robot is capable of tracing a freely programmable track and is able to perform vertical movements as well as to rotate the gripper of the tool about a vertical axis.

From this description, it may be appreciated that, track accuracy relative to the workpiece, i.e., to the ribbon cartridge, is limited. This is due to the existence of shape and positional tolerances due to the guides of the transfer system, the mounting of the ribbon cartridges within the workpiece carrier, as well as shape inaccuracies of all these components.

Cooperation between two separately installed robots with the aim of high transfer accuracy is under such circumstances extremely difficult and, if at all possible, would entail extraordinarily high costs.

This schematic representation indicates that, in an assembly step succeeding the threading process, the two band ends are welded together outside of the ribbon cartridge in order to eventually form the endless ribbon. Such welding methods are per se known (EP-A1- 0 391 842); the corresponding devices are commercially available (SM Engineering AG, Wollerau).

Figure 1A:
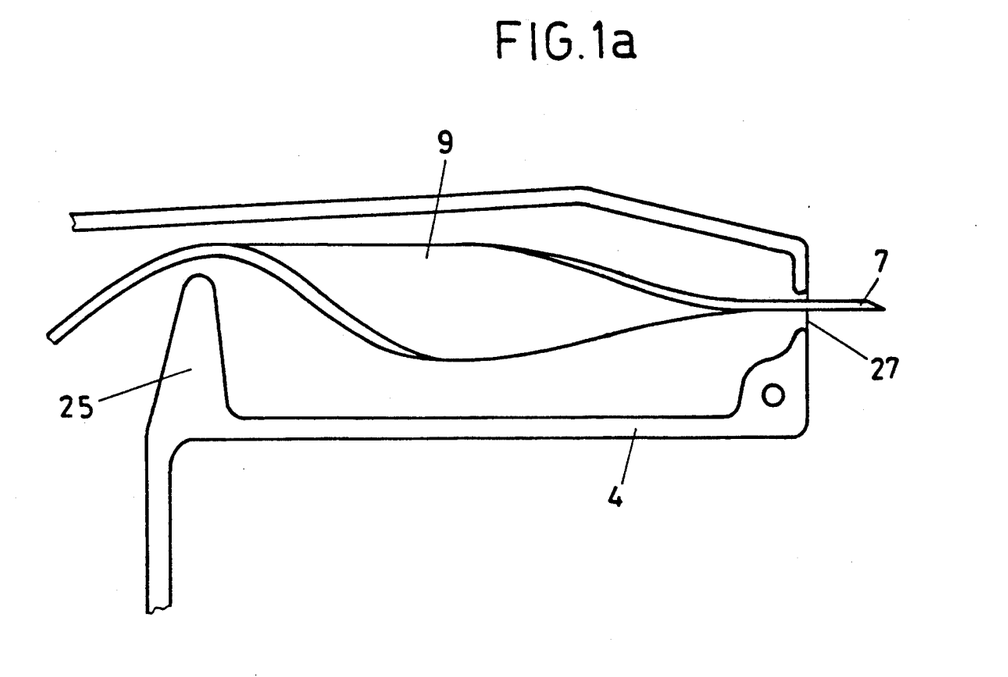
FIG. 1a is a top plan detail view of the Moebius twist of the ribbon inside the ribbon cartridge.
Figure 1B:
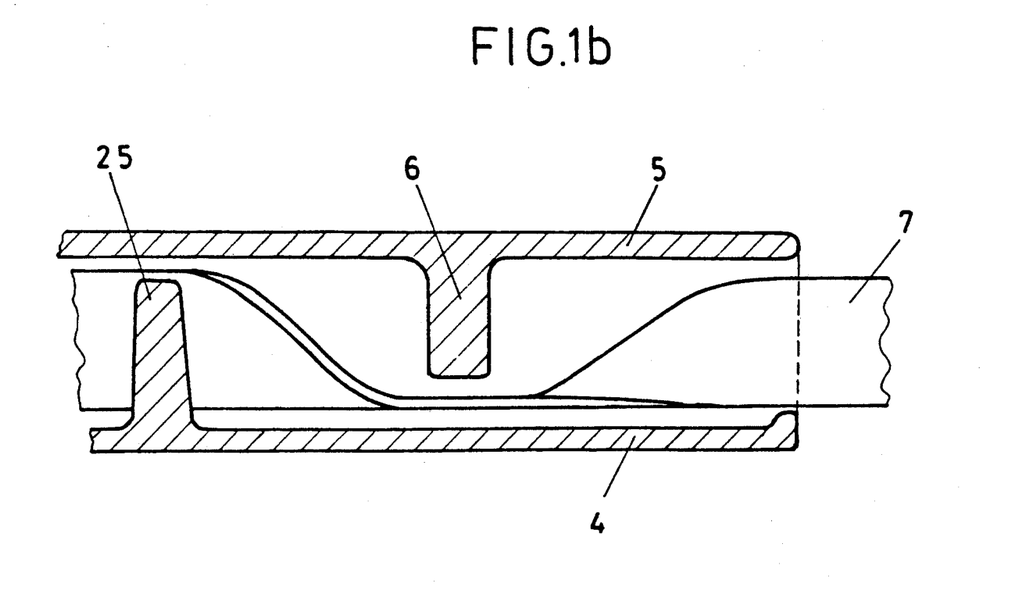
FIG. 1b illustrates in cross-sectional elevation the securing of the Moebius twist by a guide projection in the ribbon cartridge lid and the Moebius rib.

As best seen in FIG. 1a, the twisted ribbon portion 9, the characteristic feature of the endless Moebius ribbon, is in position between the Moebius rib 25 and the ribbon exit slit 27 in the lower part of the ribbon cartridge. Upon closing of the ribbon cartridge lid, as shown in FIG. 1b, the guide projection 6 provided in the ribbon cartridge lid 5 takes over the task of ensuring the ribbon twist remains at the predetermined spot.

Figure 2:
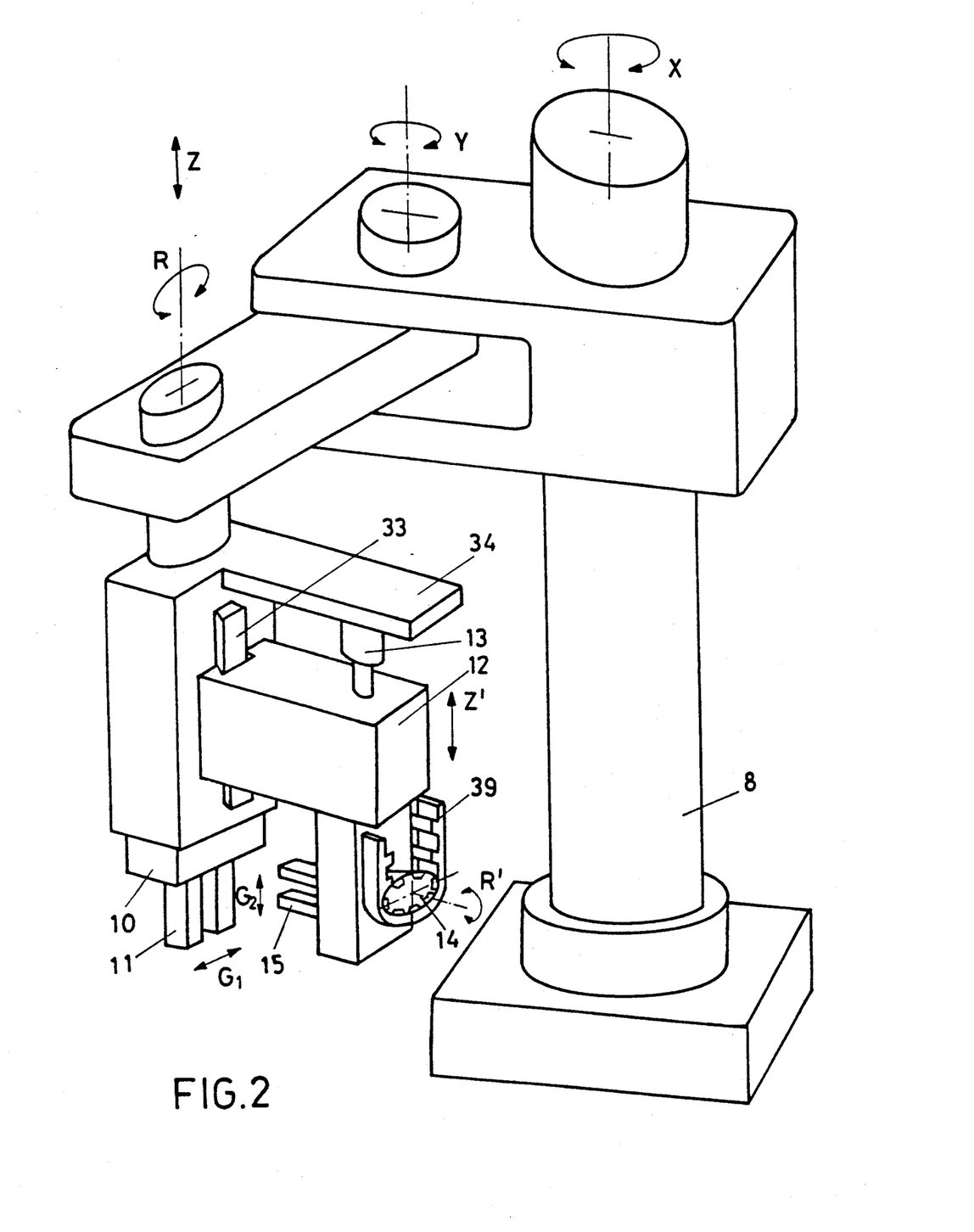
FIG. 2 is a perspective schematic view of the basis design of the first assembly robot having four degrees of freedom in combination with the second robot having two degrees of freedom.

FIG. 2 illustrates the mounting of the second robot 12 on the first robot 8. The second robot is connected to the first robot in such a way as to be mechanically movable in the vertical direction. Its first degree of freedom thus consists of the vertical translational movement Z', the second degree of freedom providing for the rotation R' of its tool about a horizontal axis. Due to this arrangement of the two robots, the pincer-like tools 11 and 15 are able to perform their gripping movements $G_1$ and $G_2$ with high precision in immediate adjacency.

FIGS. 3a to 3e show schematically the timed sequence in the coordinated interaction of the two robots. Gripper 10 of the first robot 8 has its gripping pincers 11. This gripper 10 is designed as toggle-lever gripper, its pincers spreading open up to an angle of 90°, thus fully clearing the ribbon. The second robot 12 is at least able to perform a vertical movement relative to the first robot, as well as a rotary movement with its rotary gripper 14 equipped with miniature parallel gripping pincers 15.

Figure 3A:
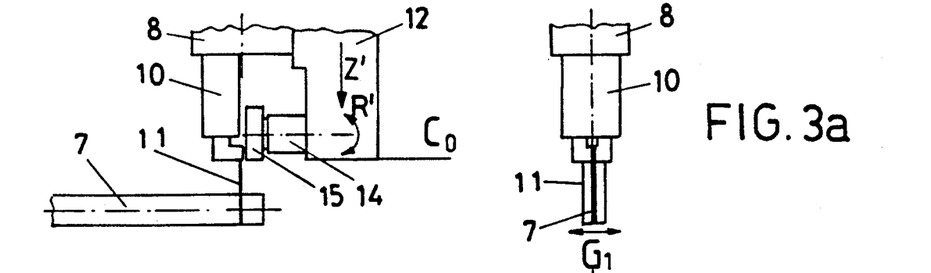
FIGS. 3a to 3e are pairs of elevation views taken perpendicular to each other each showing the steps of the automatic twist of the ribbon by 180° with the cooperation of the two robots.
Figure 3B:
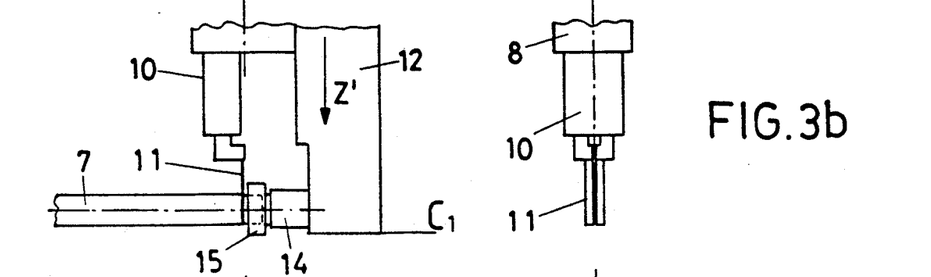

When the first robot 8 has dragged the ribbon 7 held in the pincers 11 to its predetermined position (FIG. 3a), the rotary manipulator 12 is brought standby position $C_0$ to the working position $C_1$ by carrying out the downward vertical movement $Z'$ (FIG. 3b). The ribbon 7 now juts into the gripping pincers 15. Subsequently, these pincers are closed, the ribbon being now held by the pincers 11 and 15. In order to prevent damage to the ribbon, (and particularly with respect to mechanically extremely sensitive ribbons) the gripper slots must, as exactly as possible, lie in the same plane.

Figure 3C:
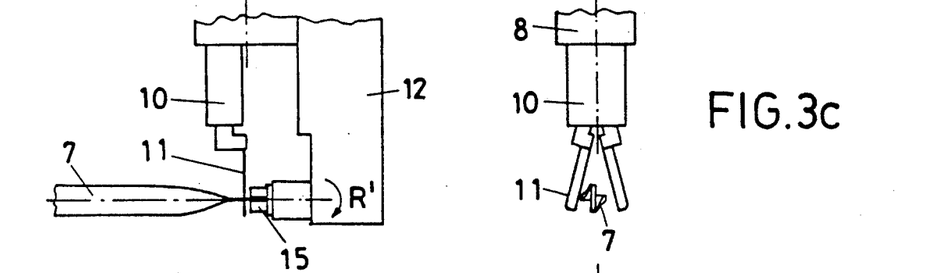
Figure 3D:
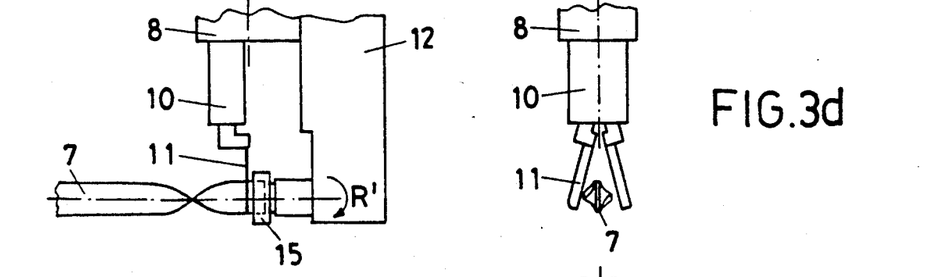
Figure 3E:
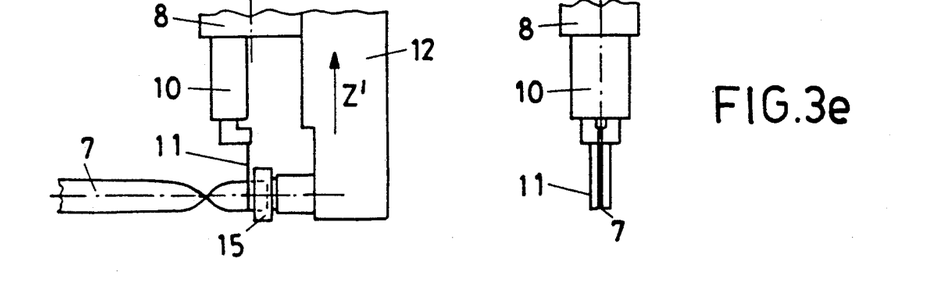

In the next step (FIG. 3c), the gripper 11 opens, and rotary movement of the rotary gripper 14 for purpose of twisting the ribbon takes place. The sense of twist (clockwise or counterclockwise) being selectable according to chosen programming. While FIG. 3c shows the situation after the rotation $R'$ of the pincers 15 by 90°, FIG. 3d presents the situation after performance of the entire twist of 180°. The ribbon is then again gripped by the gripping pincers 11 (FIG. 3e) and the gripping pincers of the rotary gripper 15 are released. The manipulator, the second robot 12, is then withdrawn by means of the upward vertical movement $Z'$ from the working position back to the standby position shown in FIG. 3a in order to facilitate the extraction of the ribbon from the ribbon cartridge, which only has room for the space-savingly designed gripping pincers 11 of the first robot.

Figure 4:
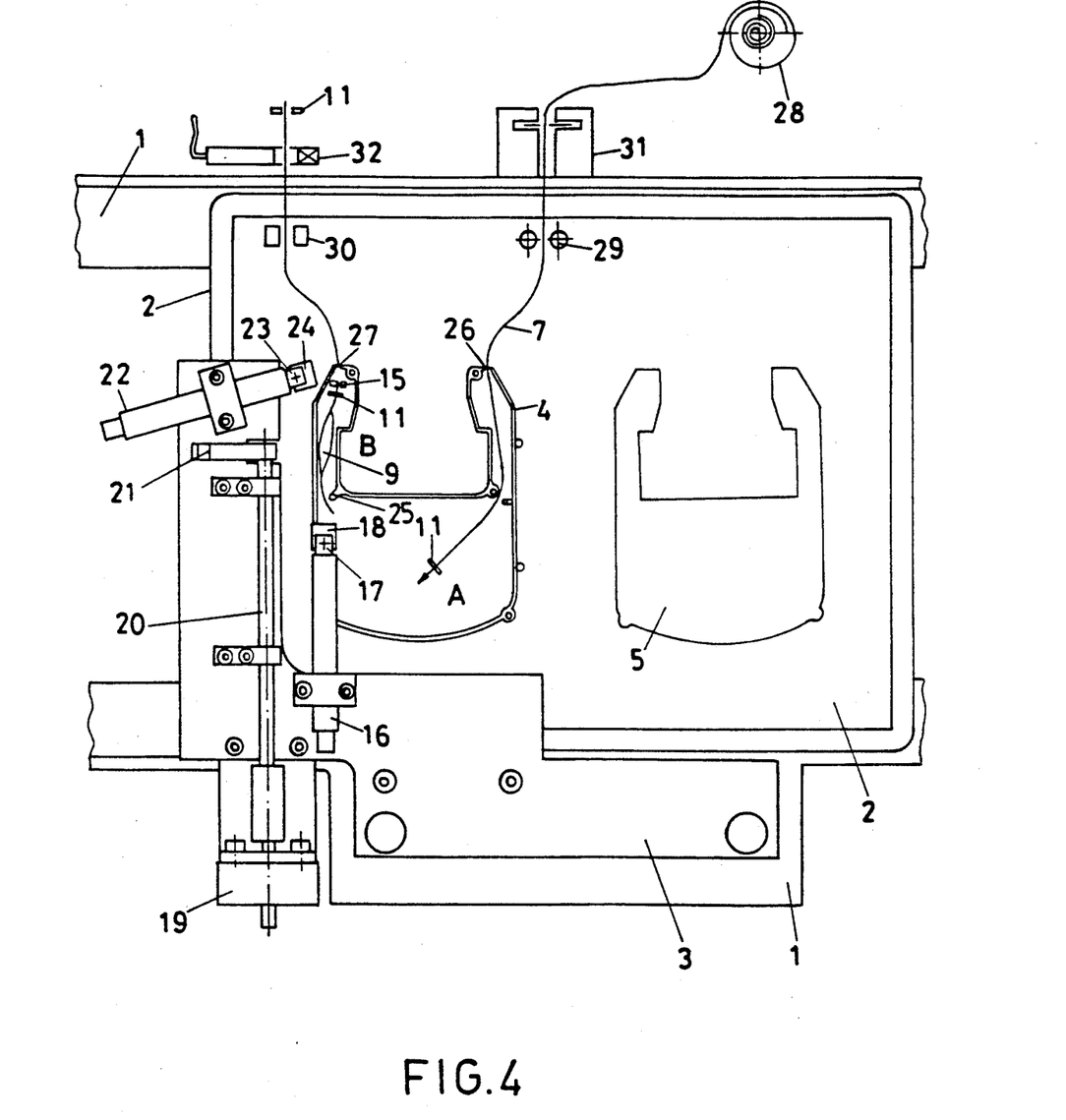
FIG. 4 illustrates the entire ribbon insertion process, including the Moebius twist, the ribbon securing elements and the ribbon extraction process.

FIG. 4 illustrates the entire sequence, including the required auxiliary operations. Prior to reaching the intermediate position A, the first robot, with its gripping pincers 11, has already taken up the ribbon 7 from a ribbon reel 28 external to the cartridge and led it into the ribbon cartridge by way of a ribbon guide 29 with a roller entrance and the ribbon cartridge inlet slot 26. Subsequently, the robot, always moving in the same horizontal plane, threads the ribbon past the Moebius rib 25 into the region B. It is in this region that the Moebius twist is to be carried out.

As the ribbon cartridge lacks sufficient space for the introduction of the rotary manipulator, it is necessary to lift the ribbon slightly upwards, out of the cartridge. This movement obviously entails the risk of the ribbon slipping out of the cartridge. In order to avoid this, a pneumatically-operated, first ribbon-securing element 16 is actuated as part of the program sequence, whereby the piston rod 17 pushes the attached tongue 18 as far as the region of the Moebius rib 25, whereby it overlies the ribbon, thus reliably preventing the ribbon from slipping out of the cartridge during the now following vertical movement of the first robot. The fact that this ribbon-securing element, as well as the other ribbon-securing elements described further below, are mounted on the carrier plate 3, produces the advantage that, upon a change of cartridge type, the entire ribbon-securing unit can be exchanged as a whole, facilitating a short changeover time.

After carrying out the above-described Moebius twist process of FIG. 3, the first robot, gripping the ribbon, again moves down to the cartridge plane, and leads the ribbon up to the ribbon exit slot 27 and threads it therethrough out of the cartridge. During this process, there exists the danger of the Moebius twist escaping through the slot. In order to prevent this from happening, second and third ribbon securing elements 19 and 22 go into action. By rotation of the shaft 20, and with the aid of the hold-down pad 21, affixed thereto, the second ribbon-securing element 19 maintains the ribbon in its position of twist in the region between the Moebius rib and the ribbon exit slot 27. Upon extension, the third ribbon-securing element 22 closes the upper end of ribbon exit slot 27 by means of its affixed tongue 24. After the robot has threaded the ribbon through the ribbon guide 30, its pincers 11 can now be safely opened.

Beyond the workpiece carrier 2, and in front of the ribbon guide 29, is located known cutting unit 31, preferably designed as scissors which, after the conclusion of the threading process, separates the threaded ribbon from the reel 28. A light gate 32 in front of the ribbon guide 30 monitors the presence of the threaded ribbon and transmits corresponding signals to the control system of the device.

After the three ribbon securing elements have opened, the transfer system moves the workpiece carrier 2 to the next workstation, where further, known working and assembly steps take place. The robot is now ready for the next threading process, including the formation of the Moebius twist, in the next cartridge. As all operations proceed fully automatically, this complex process, which demands six degrees of freedom of the robot plus two high precision pincer functions, can be carried out within a very short time and, thanks to the known self-control of the automatic movement sequence, is characterized by a very high reproducibility.

Figure 5:
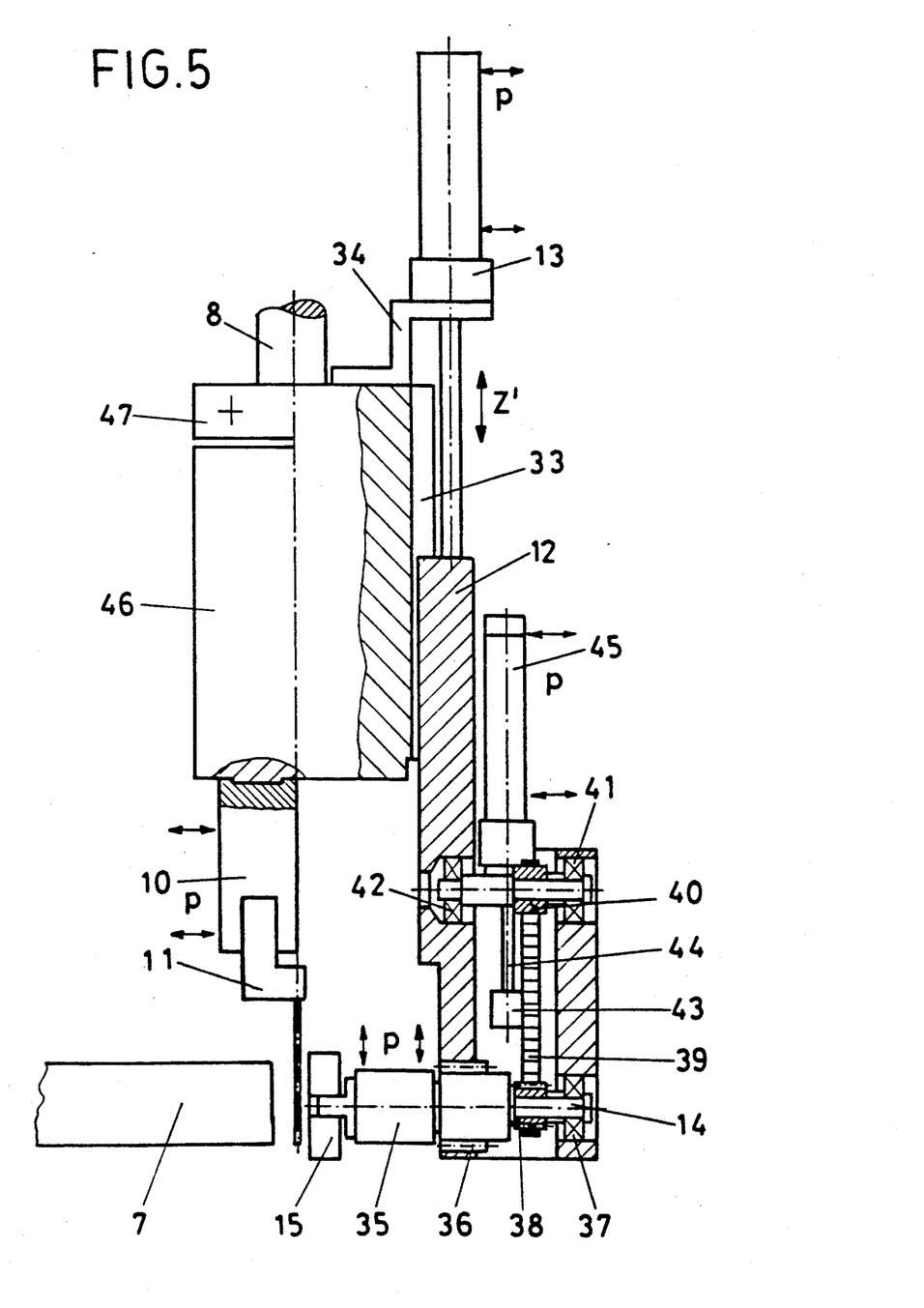
FIG. 5 shows a preferred embodiment of the invention, incorporating pneumatic actuating units.

The preferred embodiment of FIG. 5 shows gripper pincers 11 on the first robot 8, specifically suited for this application, as well as rotary gripper pincers 15 on the second robot 12. The gripper 10 is attached to the arm of the first robot 8 with the aid of a clamp 47 via an intermediate piece 46, the position of the components relative to one another being exactly determined by appropriate centering. The gripping pincers 11, in the form of a toggle-lever gripper, have especially slender fingers which, on the one hand, make it possible to lead the ribbon through the narrow spaces of the cartridge and, on the other hand, to reach the immediate vicinity of the pincers 15 of the rotary gripper 14.

The second robot 12 is mounted on the first robot in such a way as to permit a translational movement $Z'$ in the vertical direction between them. Guiding is effected with the aid of a guide slide 33 equipped with rolling-friction bearings, whereby, due to minimal clearances, the highest precision of movement is ensured while requiring minimal forces. A double-acting pneumatic actuator unit 13, which affects the relative movement by alternating compressed-air control p, is fixedly attached to the first robot 8 via a support 34.

The movement of the rotary gripper 14 through pincers 15 may be carried out by a pneumatically acting element 35, which may be in the form of, e.g., a commercially available parallel gripper unit (Fritz Schunk GmbH, D-7128 Lauffen/Neckar). For the rotary movement, the rotary gripper 14 is supported, without lost motion in any direction, in the housing of the second robot 12 by two rolling-friction bearings, the needle bearing 36 and the ball bearing 37. To minimize the volume of the structure within the working region at a minimum of costs for high reliability, the rotary movement itself, in this preferred embodiment, is derived from the longitudinal movement of a pneumatic actuator unit 45 which transmits its movement via the rod 44 and the clamp 43 to the toothed belt 39 running between the cogged wheel 38 on the shaft of the gripper 14 and the counter or idler wheel 40, mounted in ball bearings 41 and 42. This toothed-belt arrangement converts the linear motion of the rod 44 to a rotary motion, ensures a positive transmission of the movement, and is thus largely independent of errors due to wear, slip, zero-point error or drift phenomena.

All structural elements not essential for a direct understanding of the object of the invention by one skilled in the art, such as, e.g., connections for the pneumatic actuator units, screws for the mutual connection of components, solenoid valves for sequential control and the like, have been left out for the sake of clarity in FIGS. 4 and 5. Also, the representation of the preferred embodiment in a cross-sectional view along a single plane was chosen only for reasons of simplification and improved clarity. In practice, it may be advantageous to use different planes to place the separate elements, to use for the second robot not a vertical, but a horizontal or a swiveling movement, to use sliding-friction bearings, or the like. Such modification would be known in the art.

The present invention as characterized bypasses all forms of shape and positional tolerances of the transfer system, the workpiece carrier, the relative deviations of their positions, as well as of the origins of coordinates of the robots, thus ensuring maximal positioning accuracy. Space requirements in the narrow working region of the ribbon cartridge is reduced to a minimum. Movement sequences, and thus additional operational times that would be needed by the introduction of a separate robot, are eliminated; movements in a required sequence follow one another directly. Forces and accelerations are easily adapted to the material quality of the ribbon and to other parameters changing with the product.

The present invention is not intended to be limited to what is shown in the drawings. Thus, the invention could be of a mechanically different design, could be driven by motors of a different type, or could be moved in different planes. Also, the use of the method and the device shown is not limited to the threading of ink ribbons into cartridges, but can indeed be used in a general way for producing Moebius strips, as well as for threading into particularly narrow and inaccessible slots. In the latter case, the ribbon could also change from the usual flat cross-section to other cross sections, even to a wire, and instead of being threaded through a slot open on top, the transfer function of the two robots could also be used to put such a wire through a circumferentially closed hole.

The present invention thus may be used in a general way for delicate assembly work.

We claim:

1. A device for the series production of Moebius-type ribbons in the course of the manufacturing of ribbon cartridges equipped with endless ribbons, which are mounted on a workpiece carrier, comprising a first robot element for threading of one end of a ribbon element into the ribbon cartridge, and a second robot mounted on said first robot, said second robot having at least two degrees of freedom, said second robot adapted to twist the ribbon element in its longitudinal direction by 180° in a given section.

2. The device according to claim 1, characterized in that the second robot is adapted to be movable relative to the first robot in a direction perpendicular to a plane of the ribbon.

3. The device according to claim 1, characterized in that the second robot is designed and arranged to be movable on the first robot by means of a guide slide.

4. The device according to claim 1, further comprising a pneumatic actuator unit and an endless toothed belt engaged thereby, said belt being operatively connected to a pair of gripping pincers mounted in the center of a cogged wheel of a rotary gripper on the second robot, whereby rotation of said gripping pincers may be effected.

5. The device according to claim 1, wherein said first robot includes a toggle-lever gripper having gripper pincers having a maximum pincer opening of about 90°.

6. The device of claim 1 further comprising at least one pneumatically operated ribbon securing element to retain at least a portion of the ribbon within the cartridge during said threading and twisting process.

7. The device according to claim 6, wherein said at least one securing element comprises a first ribbon securing element having a pneumatically activated tongue to hold the ribbon element down in the ribbon cartridge at a fixed location element the first robot having means to simultaneously lift a portion of the ribbon out of hte ribbon cartridge for the purpose of applying a Moebius twist.

8. The device according to claim 6, wherein said at least one securing element comprises a second actuated ribbon securing element having a pneumatically actuated hold-down pad for maintaining the ribbon in its horizontal position after application of a Moebius twist thereto.

9. The device according to claim 6, wherein said at least one securing element comprises a third ribbon securing element having a pneumatically actuated tongue for holding down the ribbon in a ribbon exit slot of the ribbon cartridge after the ribbon has been threaded therethrough.

10. The device according to claim 6, wherein said at least one securing element is mountable to said workpiece carrier.

11. The device according to claim 1 comprising at least one ribbon guide mountable on the workpiece carrier outside of the ribbon cartridge, each of said at least one ribbon guide comprising a roller for the beginning of, can a fixed ribbon guide for the end of, the ribbon element threaded through said cartridge.

12. The apparatus according to claim 11, wherein said second robot comprises means for twisting the ribbon in a plane parallel to the plane of the ribbon cartridge.

13. The device of claim 1, further comprising means for coordinating the movement of said two robots.

14. The apparatus of claim 13, wherein said coordinating means comprises pneumatic elements for the control and drive of said second robot.

* * * * *